United States Patent Office.

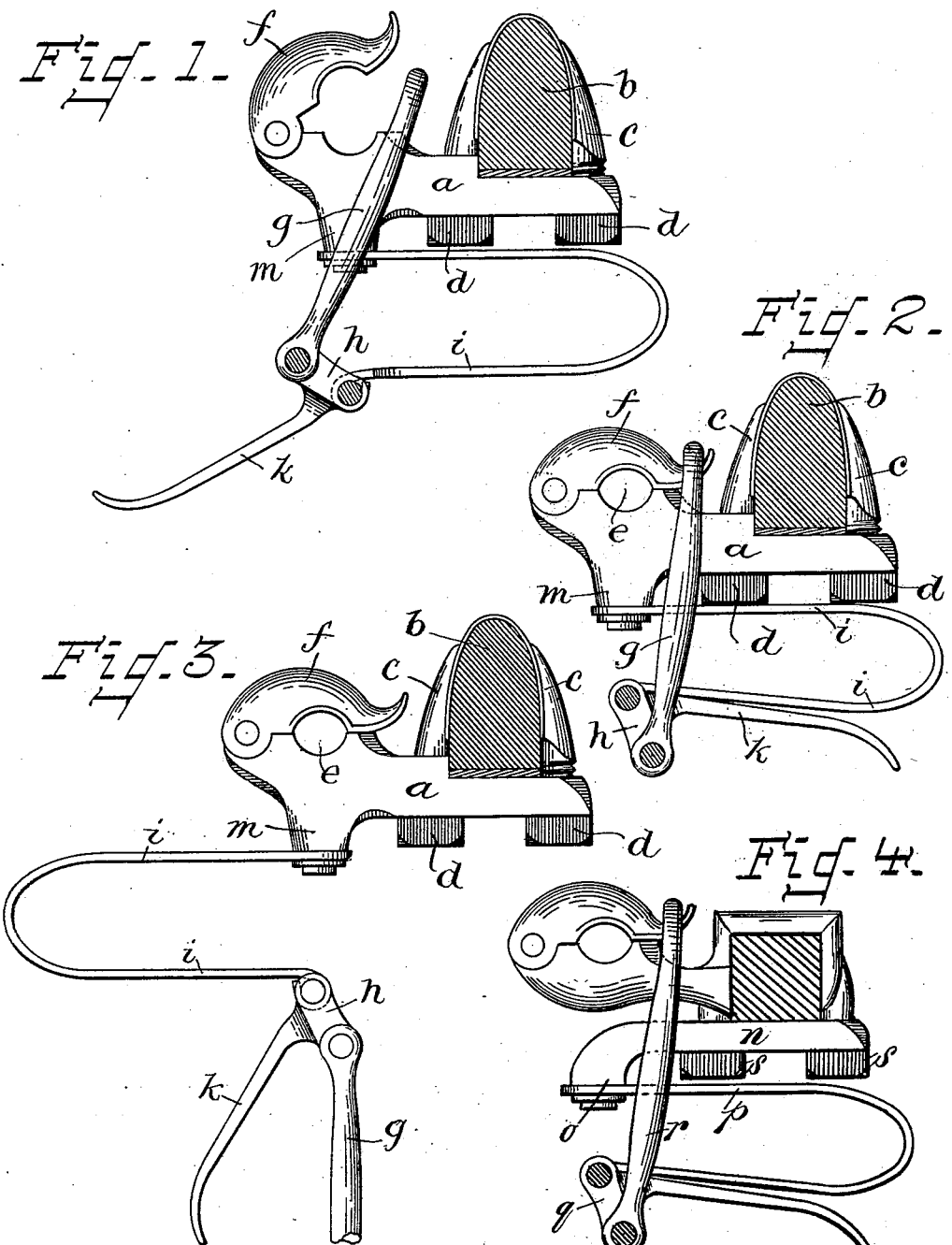

RICHARD ECCLES, OF AUBURN, NEW YORK.

THILL-COUPLING.

SPECIFICATION forming part of Letters Patent No. 714,163, dated November 25, 1902.

Application filed April 29, 1902. Serial No. 105,189. (No model.)

*To all whom it may concern:*

Be it known that I, RICHARD ECCLES, a citizen of the United States, residing at Auburn, in the county of Cayuga and State of New York, have invented certain new and useful Improvements in Thill-Couplings, of which the following is a specification, reference being had therein to the accompanying drawings.

This invention relates to that class of shaft and thill couplings comprising a divided draft-eye formed by fixed and movable parts on the draft-bar, the said movable part being held in operative position by means of a pivoted holding loop or bail connected with a retaining-spring provided with a lever acting, in connection with the said loop or bail and said spring, as a toggle, so that by moving the said lever to one position or another the holding loop or bail may be retained in operative position or may be released from the movable part of the draft-eye.

The invention has for its object to provide a coupling device of the particular class referred to which is of such construction that when the holding loop or bail is released the retaining-spring and its attached lever may be swung aside horizontally to permit of convenient access to the nuts of the clip which secures the coupling to the axle. To this end the draft-bar is provided with a depending lug or projection, with which the holding-spring is attached by a vertical pivot connection, which permits the said spring and the lever and loop or bail attached thereto to be swung around horizontally when the said loop or bail is disconnected from the lever forming the movable part of the divided draft-eye on the draft-bar.

In the drawings, Figure 1 represents the improved coupling with the holding loop or bail released from the movable part or lever of the draft-eye, and Fig. 2 represents the parts in operative position. Fig. 3 shows the retaining-spring and its attached lever and loop or bail swung aside horizontally for convenient access to the nuts on the clip. Fig. 4 shows a modified form of coupling.

Referring to the drawings, $a$ denotes the draft-bar, which is to be rigidly fixed to the axle $b$ by means of a U-shaped clip $c$, having threaded arms or parts to receive nuts $d$, by which the draft-bar is secured to the axle. The clip $c$ may be integral with or separate from the draft-bar. The draft-bar is provided with a draft-eye $e$ for the reception of a coupling-pin which joins the thill-iron to the coupling, said eye being formed partly by a seat in the draft-iron and partly by a seat in a pivoted cap or lever $f$, mounted on the draft-iron. The lever $f$ is retained in the operative position (shown in Fig. 2) by a loop or bail $g$, the upper end of which engages the hooked or upturned free end of the said cap or lever $f$, and the lower end of said bail is jointed to a link or lever $h$, which is in turn pivotally connected with or jointed to an eye on a holding-spring $i$, said link or lever $h$ being provided with an operating-handle $k$.

By reference to Figs. 1 and 2 it will be observed that the retaining-spring is normally in such position that it prevents convenient access to the nuts $d$, by which the clip $c$ is secured to the axle, and to provide for convenient access to the said nuts the said retaining-spring $i$ is mounted on the draft-bar so that it may be swung aside horizontally when desired. To this end the draft-bar is provided with a depending lug or projection $m$, to which the said retaining-spring is attached by a vertical pivot connection, so that when the link or lever $h$ has been moved into the position shown in Fig. 1 to release the loop or bail from the movable part or lever of the draft-eye the said loop or bail may be swung over the said lever before the latter is opened, and the retaining-spring and the loop or bail and the link or lever carried thereby may be swung around horizontally to the position shown in Fig. 3, thereby affording free access to the nuts $d$ when attaching or removing the clip $c$. In securing or releasing the loop or bail $g$ the link or lever $h$ acts in coöperation with said loop or bail as a toggle in a well-known manner.

The projection $m$ being directly beneath the socket or draft-eye, which in practice receives a ball-bearing coupling-pin, serves to strengthen the draft-bar beneath said socket, as well as affording means by which the spring $i$ may be pivotally attached to said draft-bar, so that said spring can be swung into or out of its operative position for the purposes hereinbefore indicated.

Instead of forming the lug or projection upon the draft-bar, as shown in Figs. 1, 2, and 3, it might be formed on the end of the clip-tie $n$, which secures the coupling to the axle, as shown in Fig. 4. The end of the clip-tie $n$ is preferably curved downwardly, as shown, and has the lug or projection $o$ depending therefrom, to which the retaining-spring $p$, with its supported link $q$ and bail $r$, is pivoted, so as to give a sufficient clearance for the spring relative to the nuts $s$ and permit it to be readily swung aside in the manner described in connection with the other construction.

Having thus described my invention, I claim and desire to secure by Letters Patent—

1. In a shaft or thill coupling, the combination with the draft-bar $a$ having a seat for the coupling-pin, of a clip for securing the draft-bar to the axle, a lug or projection $m$ depending from said draft-bar, a pivoted cap or lever to hold the coupling-pin in the draft-bar seat, a bail to engage said cap or lever and secure it in operative position, a retaining-spring having a vertical pivot connection at one end with the said depending lug or projection, and a lever having a jointed connection with the other end of said retaining-spring and with the said loop or bail; whereby when the said loop or bail is released from the pivoted cap or lever the said retaining-spring and the bail and lever carried thereby may be swung aside horizontally for convenient access to the nuts of the said clip securing the coupling to the axle.

2. In a shaft or thill coupling, the combination with a draft-bar having a coupling-pin seat, a cap pivoted to said draft-bar to hold the coupling-pin in the draft-bar seat, a substantially U-shaped retaining-spring having a vertical pivot connection at one end with said draft-bar upon which said spring and its supported parts may be swung horizontally beneath said draft-bar to permit convenient access to the nuts of the draft-bar-securing clip, a lever pivotally connected with the other end of said retaining-spring, and a bail pivotally connected with said lever and adapted to engage and hold the said coupling-pin cap in closed position.

In testimony whereof I affix my signature in presence of two witnesses.

RICHARD ECCLES.

Witnesses:
SQUIRE P. CODNER,
ANDREW H. JOHNSON.